Dec. 22, 1942.  P. TURA  2,305,818
ANTIGLARE DEVICE
Filed Oct. 3, 1939

INVENTOR
PAOLO TURA
BY Young, Emery + Thompson
ATTYS.

Patented Dec. 22, 1942

2,305,818

UNITED STATES PATENT OFFICE 2,305,818

ANTIGLARE DEVICE

Paolo Tura, Milan, Italy; vested in the Alien Property Custodian

Application October 3, 1939, Serial No. 297,737
In Italy October 18, 1938

1 Claim. (Cl. 240—48.2)

The present invention relates to an anti-dazzling device, specially for head lamps of motor-vehicles. This device principally comprises means forming an at least partially reflecting screen arranged in front of the source of light in such a way that the rays of light which tend to leave directly without falling on the projector are intercepted and deviated towards the latter, so that even these rays leave the reflector only after having been suitably reflected.

In a preferred embodiment, the means forming the screen, comprises a diffusor-disc, made, for instance, of opaque or dulled glass combined with a series of annular discs substantially parallel to the diffusor and arranged at a certain distance from one another. These discs, as well as their setting, are preferably white.

The whole device is arranged in the form of a cage surrounding at least partly the incandescent bulb and can be fixed at the bottom of the projector to the socket of the lamp or, preferably, to the protecting glass of the head lamp.

In another preferred embodiment, the diffusor-disc is replaced by a diaphragm with a parabolic, reflecting or diffusing surface.

Other objects and features of the invention will appear hereinafter.

Figures 1, 4:
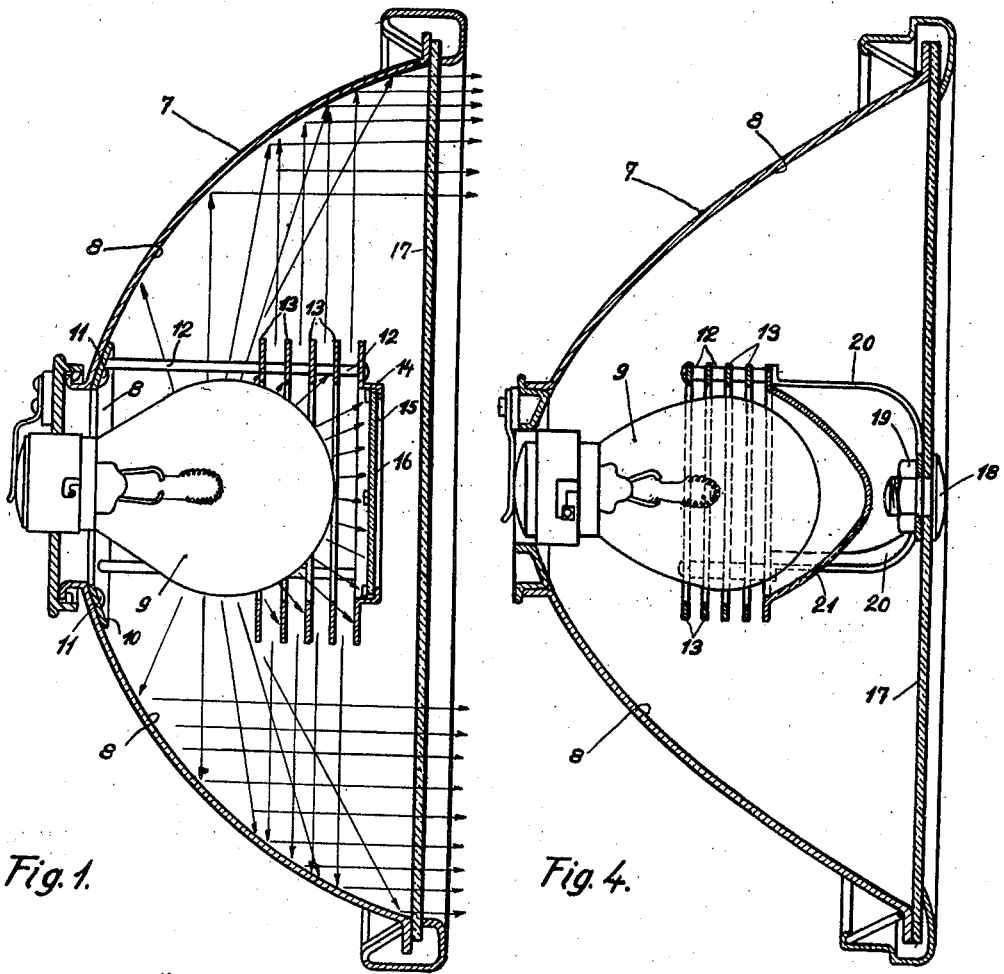
Figure 1 is a section of the first embodiment.
Figure 4 is a section of the second embodiment.
Figure 2:
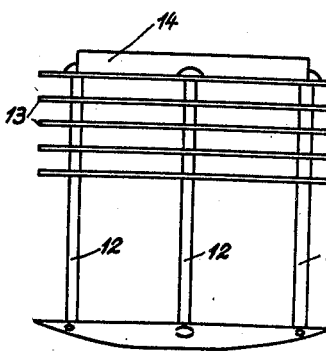
Figure 2 is a side-view of this first embodiment.
Figure 3:
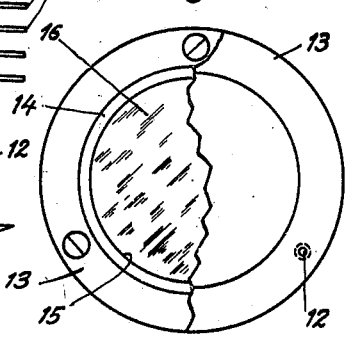
Figure 3 is a plan-view, in which certain parts are removed.

Referring to the first embodiment shown in Figs. 1 to 3, the reflector 7 provided with a parabolic mirror 8 and an incandescent bulb 9, carries an annular support 10, lying on the bottom of the mirror 8, and being fixed to the reflector with the aid of screws 11 or any other suitable means. The support 10 carries several columns 12 bearing annular discs 13 which are placed at a suitable distance from one another. The bulb 9 extends into the opening in said discs 13. One or more of the annular discs, preferably the last, comprises a flange 14 with a central opening 15, said flange serving to fix an opaque or opaline glass 16. This glass may be superseded by an equivalent means (dulled or coloured glass), adapted to diffuse or reflect the light.

The rays of light emitted by the source 9 which do not directly fall on the parabolic mirror, are deviated towards the latter by means of the annular discs 13. Due to this fact a beam of light results which is compact, homogen and free from spread and which eliminates any dazzling and secondary or indirect reflection.

At least one of the surfaces of the annular discs 13 is diffusing, reflecting or coloured.

Figure 5:
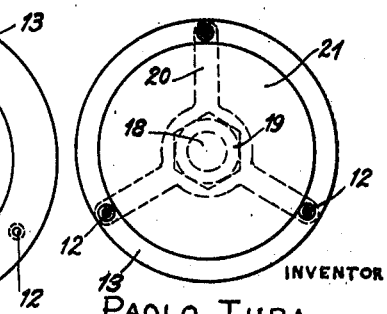
Figure 5 is a plan-view of this second embodiment.

In the embodiment shown in Figs. 4 and 5 the protecting glass 17 of the head lamp is bored at the centre for the purpose of making way for a bolt 18 to which a nut 19 is screwed. Between the latter and the glass 17 a support 20 is fixed, carrying the columns 12 to which the annular discs 13 are attached.

The distance, the number and the dimensions of the annular discs depend on the characteristics of the parabolic mirror 8. The last annular disc 13 is formed as the edge of a parabolic, opaque or opaline diaphragm 21 diffusing towards the parabolic mirror 8 those rays of light emitted by the source 9, which tend to leave the reflector directly. The parabolic diaphragm 21 preferably lies co-axial to the parabolic mirror 8.

The mode of fixing this second embodiment allows of an easy adaptation of the anti-dazzling device to head lamps of known types.

In the case of head lamps for motor-vehicles, the beam of light, emitted with the aid of the device according to the invention, is, because of its greatly reduced dispersion, particularly suited for illumination in foggy, rainy or snowy weather. It does not dazzle persons reached by the beam of light. Furthermore, the vehicle driver is not disturbed, while, with the reflectors hitherto known, drivers were often annoyed by the reflections of the dispersed rays which are reflected by a wet road, especially if the latter has an asphalt surface.

It is a matter of course that the anti-dazzling device according to the invention cannot only be used in head lamps for motor-vehicles but also in any other apparatus for illumination.

What I claim is:

In a head lamp, especially for motor vehicles, the combination with a substantially parabolic reflector having a transparent cover, of an incandescent bulb and an internal antidazzling device comprising a front parabolic diffusing screen arranged coaxially to said reflector and a plurality of reflecting annular discs arranged cage-like around said bulb substantially parallel to each other and to the focal plane of said reflector, at least two columns securing the discs in close relation to each other, the last of said annular discs being integral with said front parabolic screen, and a support carrying said columns and screwed to the centre of said transparent cover, independently of said bulb.

PAOLO TURA.